M. Spear,
Miter Box.

№ 10,936.  Patented May 16, 1854.

THE NORRIS PETERS CO., WASHINGTON, D. C.

UNITED STATES PATENT OFFICE.

MATTHEW SPEAR, OF BOWDOINHAM, MAINE.

MITER-BOX.

Specification of Letters Patent No. 10,936, dated May 16, 1854.

*To all whom it may concern:*

Be it known that I, MATTHEW SPEAR, of Bowdoinham, in the county of Lincoln and State of Maine, have invented a new and Improved Self-Regulating Miter-Box; and I do hereby declare that the following is a full, clear, and exact description of the construction and operation of the same, reference being had to the annexed drawings, forming part of this specification, in which—

Figure 1:
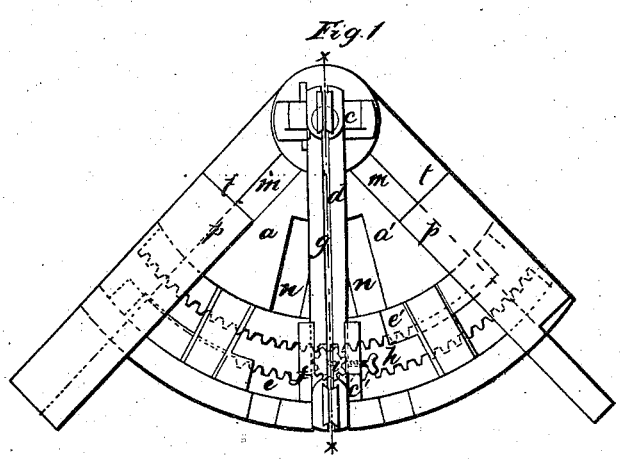
Figure 2:
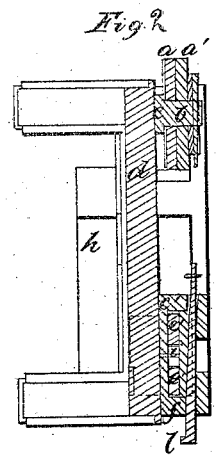
Figure 3:
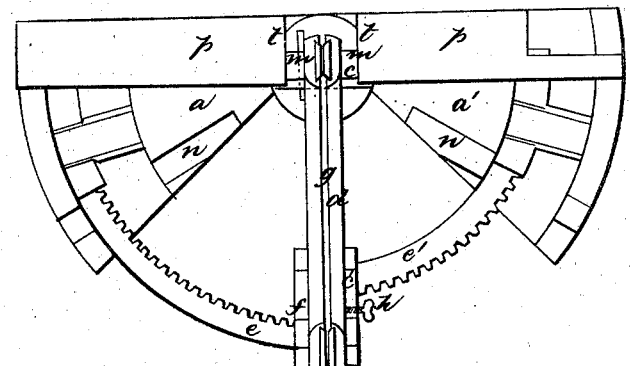
Figure 4:
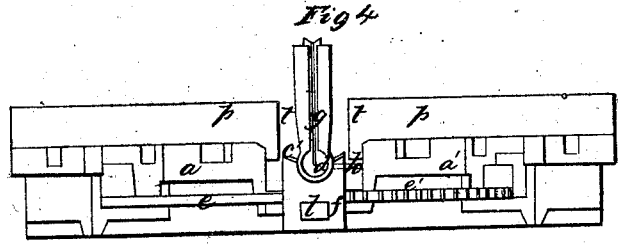

Figure 1 is a plan of the machine. Fig. 2 is a vertical section on line $x$ $x$ of Fig. 1. Fig. 3 is a plan of the machine with saw guide perpendicular to side guides. Fig. 4 is a front elevation of the machine in same position.

Similar characters of reference in the several figures denote the same part of the machine.

The nature of my invention consists in the arrangement of two supporters or lumber bearers connected at one extremity so as to turn about a common pivot with the saw guide, the outer extremities of supporters and saw guide being connected by mechanism hereafter to be described, so that the said saw guide shall bisect all angles which may be contained between the faces of the supporters in the several positions in which they may be placed.

My invention also consists in a side adjustment of the saw guide, by which angles 90° and under with the plane of the lumber bearers, may be cut on lumber, laid over said bearers and across the saw guide as will be hereafter fully set forth.

To enable others skilled in the art to make and use my invention, I will proceed to describe its construction and operation.

In the drawing $a$ $a'$ are the lumber bearers or supporters overlapping at one extremity as shown in Fig. 2 and movable about the pin $b$; on the head of this pin is the seat $c$ in which one extremity of the saw guide $d$ rests, so that the supporters $a$ $a'$ and saw guide $d$ are all attached by one extremity to the pin $b$. Attached to the outer extremities of the lumber supporters $a$ $a'$ are the concentric racks $e$, $e'$, which pass through the lower portion of the box $f$, the upper part of which forms the seat $c'$ of the outer extremity of the saw guide $d$. In this box $f$ is the pinion $i$ meshing into the racks $e$ $e'$, so as to cause any movement of one rack to produce in the other a motion of the same amplitude, in an opposite direction. The effect of this arrangement it is evident will be to cause the supporters $a$ $a'$ when drawn asunder around the pin $b$ to move so as to make at all times equal angles with the saw guide $d$, or in other words to cause the slot $g$ in which the saw moves to bisect any angle which may be included between the inner faces of these lumber supporters $a$ $a'$, or any two lines on their upper faces which make equal angles with the before mentioned side faces.

The saw guide $d$ is formed with a curved bottom resting in the seats $c$ $c'$ and has uprights at each extremity for steadying the saw; it is capable of moving side ways in the seats and is held in any position by the screw $h$. The wedge $l$ tightens the racks $e$ $e'$ in the box $f$ and secures the machine at any set which may be given it. In the top of the lumber supporters are the grooves $m$ $m$ and $n$ $n$ both grooves of each pair making the same angle with the inner face of their respective supporters. In these grooves are inserted the side guides $p$, for holding the lumber to be operated upon.

The operation of my improved miter box is as follows:

The tongues on the lower faces of the side guides $p$ are inserted in the grooves $m$ $m$ or $n$ $n$ according to the size of angle to be cut, when the guides are held by the grooves $n$ $n$, a bevel set to the required angle is then placed against the inner faces of said guides $p$, the lumber bearers turning about their joints and opening to accommodate the bevel. As soon as the inner faces of the guides $p$ include the given angle the wedge $l$ is pressed in, and the machine secured at the given set. As above described the opening of the supporters $a$ $a'$ takes place equally on each side of the saw guide $d$ so that when the supporters are secured at any given angle, the slot $g$ of the saw guide bisects the angle, and the machine is ready for operation. The piece to be mitered is then placed against one of the side guides $p$ in the usual manner and the saw worked through the slot $g$ until the cut is finished.

If it be desired to cut the supplement of an angle included between the faces of the guides $p$, the piece is placed against the ends $t$ of the guides and perpendicular to them, and the cut made as before.

When the machine is opened so that the guides *p* are in the same line as shown in Fig. 3 in which case the guides *p* are in the slots *m* the piece can be cut at a right angle so long as the saw guide has the position given in Fig. 4. But by loosening the screw *h* and turning the guide *d* in its seats *c c'* any desired angle from the plane of the lumber bearers may be cut in the machine, this would be used for cutting boards which are wider than the height of the uprights of the saw guide. The saw guide being in this last case inclined to the plane of the machine to give the angle, and secured in position by the screw *h*.

I do not confine myself to the exact mechanism herein described for causing the supporters *a a'* to open the same distance on both sides of the saw-guide, but may vary the details in many respects without affecting the important feature of my invention—namely the bisecting of the angle to which the machine is set, by the saw guide.

By turning the outer edge of either of the guides *p* inward, stuff can be cut to any required length.

What I claim as my invention and desire to secure by Letters Patent, is—

1. The two supporters or lumber bearers *a a'* connected and turning about a common center, in combination with the saw guide *d* attached to the same pivot and so connected by mechanism with said supporters as to cause it at all times to bisect the angle at which the supporters may be set.

2. I also claim the turning of the saw guide from its vertical position as herein set forth for cutting any desired angle with the plane of the lumber supporters substantially as specified.

In testimony whereof, I have hereunto signed my name before two subscribing witnesses.

MATTHEW SPEAR.

Witnesses:
GEO. PATTEN,
SAML. GRUBB.